(12) United States Patent
Grundei et al.

(10) Patent No.: US 10,680,260 B2
(45) Date of Patent: Jun. 9, 2020

(54) ARRANGEMENT FOR A CATHODE RECIRCULATION IN A FUEL CELL AND METHOD FOR CATHODE RECIRCULATION

(71) Applicants: VOLKSWAGEN AG, Wolfsburg (DE); AUDI AG, Ingolstadt (DE)

(72) Inventors: Daniel Grundei, Braunschweig (DE); Maren Ramona Kirchhoff, Braunschweig (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 102 days.

(21) Appl. No.: 15/769,300

(22) PCT Filed: Oct. 19, 2016

(86) PCT No.: PCT/EP2016/075051
§ 371 (c)(1),
(2) Date: Apr. 18, 2018

(87) PCT Pub. No.: WO2017/067966
PCT Pub. Date: Apr. 27, 2017

(65) Prior Publication Data
US 2018/0301720 A1    Oct. 18, 2018

(30) Foreign Application Priority Data
Oct. 22, 2015   (DE) .................. 10 2015 220 641

(51) Int. Cl.
*H01M 8/04223* (2016.01)
*H01M 8/2475* (2016.01)
(Continued)

(52) U.S. Cl.
CPC ... *H01M 8/04231* (2013.01); *H01M 8/04097* (2013.01); *H01M 8/04111* (2013.01);
(Continued)

(58) Field of Classification Search
CPC ............... H01M 8/04231; H01M 8/04097
See application file for complete search history.

(56) References Cited

U.S. PATENT DOCUMENTS

2005/0221148 A1* 10/2005 Goebel ............ H01M 8/04014
429/415
2007/0281201 A1   12/2007 Sederquist et al.

FOREIGN PATENT DOCUMENTS

DE   10 2008 016 578 A1   10/2009
DE   10 2012 018 513 A1   3/2014
(Continued)

*Primary Examiner* — Olatunji A Godo
(74) *Attorney, Agent, or Firm* — Seed Intellectual Property Law Group LLP (57) ABSTRACT

The invention relates to an arrangement for a cathode recirculation of a fuel cell (10) of a fuel cell system (1) with a cathode supply (30) for the fuel cell (10), having a cathode supply path (31) and a cathode waste gas path (32), and a flushing loop (50) of a stack housing (16) of the fuel cell (10) is mechanically connected in terms of fluid to the cathode supply (30), wherein a recirculation fluid (7) can be circulated in the cathode supply (30) and in the flushing loop (50) by means of a recirculation fluid pressure generator (33, 53) in the cathode supply (30) and/or in the flushing loop (50). The invention also relates to a method for cathode recirculation of a fuel cell (10) of a fuel cell system (1) if a vehicle, in particular of an electric vehicle, wherein a recirculation fluid (7) is conveyed through a cathode supply path (31), through the cathode chambers of the fuel cell (10), and through a cathode waste gas path (32), and the recirculation fluid (7) is also conveyed through a flushing loop (50) for a stack housing (16) of the fuel cell (10) as well as the stack housing (16).

20 Claims, 2 Drawing Sheets

(51) Int. Cl.
*H01M 8/04089* (2016.01)
*H01M 8/04111* (2016.01)
*H01M 8/04225* (2016.01)
*H01M 8/04228* (2016.01)
*H01M 8/22* (2006.01)

(52) U.S. Cl.
CPC ... *H01M 8/04225* (2016.02); *H01M 8/04228* (2016.02); *H01M 8/222* (2013.01); *H01M 8/2475* (2013.01)

(56) References Cited

FOREIGN PATENT DOCUMENTS

| | | |
|---|---|---|
| DE | 10 2014 205 031 A1 | 9/2015 |
| DE | 10 2014 005 127 A1 | 10/2015 |
| JP | 2004-055205 A | 2/2004 |

* cited by examiner

ARRANGEMENT FOR A CATHODE RECIRCULATION IN A FUEL CELL AND METHOD FOR CATHODE RECIRCULATION

The invention relates to an arrangement for a cathode recirculation of a fuel cell of a fuel cell system. Furthermore, the invention relates to a method for cathode recirculation and a method for stack-housing flushing of a fuel cell of a fuel cell system. The invention also relates to a fuel cell system and/or a vehicle, in particular an electric vehicle, having such a fuel cell system.

A fuel cell uses an electrochemical conversion of a fuel with oxygen to water to generate electrical energy. For this, the fuel cell contains as a core component at least what is known as a membrane electrode assembly (MEA), which is a structure composed of an ion-conducting, often proton-conducting membrane and electrodes—an anode electrode and a cathode electrode—arranged on both sides of the membrane. In addition, gas diffusion layers (GDL) can be arranged on both sides of the membrane electrode assembly on the sides of the electrodes facing away from the membrane.

The fuel cell is normally formed by means of a plurality of membrane electrode assemblies arranged in a stack, wherein their electrical outputs are cumulative in an operation of the fuel cell. Bipolar plates, also called flow field plates or separator plates, are most often arranged between the individual membrane electrode assemblies, which bipolar plates ensure a supply to the membrane electrode assemblies, in other words a supply of the operating media—what are known as the reactants—to the individual cells of the fuel cell and typically also serve for cooling. In addition, the bipolar plates ensure an electrical contact with the membrane electrode assemblies.

During operation of the individual cells of the fuel cell, the fuel—what is known as an anode operating medium, in particular hydrogen ($H_2$) or an aqueous gas mixture—is supplied to the anode electrodes across an open flow field of the bipolar plates at the anode side, where an electrochemical oxidation of $H_2$ to $H^+$ with loss of electrons ($e^-$) takes place ($H_2 \rightarrow 2H^+ + 2e^-$). A hydrous or anhydrous transport of protons ($H^+$) from the anode electrodes (assembled anode of the fuel cell) into the anode chambers of the individual cells to the cathode electrodes (assembled cathode of the fuel cell) in the cathode chambers of the individual cells takes place through the membranes or electrolytes of the membrane electrode assemblies which separate and electrically insulate the reaction chambers gas-tight from one another. The electrons provided at the anode are guided to the cathode via an electrical conductor and an electrical load (electric motor).

What is known as a cathode operating medium, in particular oxygen ($O_2$) or an oxygen-containing gas mixture, for example air, is supplied to the cathode electrodes via a flow field that is open at the cathode side, wherein a reduction from $O_2$ to $O^{2-}$ occurs with a takeup of electrons ($\frac{1}{2}O_2 + 2e^- \rightarrow O^{2-}$). At the same time, oxygen anions ($O^{2-}$) formed at the cathode electrodes react with the protons transported through the membranes or electrolytes to form water ($O^{2-} + 2H^+ \rightarrow H_2O$).

In order to supply a fuel cell stack (mainly referred to below as a fuel cell) with operating media, said fuel cell stack or fuel cell comprises on the one hand an anode supply and on the other hand a cathode supply. The anode supply has an anode supply path for a supply of the anode operating medium into the anode chambers of the fuel cell and an anode waste gas path for a discharge of an anode waste gas from the anode chambers. Analogously, the cathode supply has a cathode supply path for a supply of the cathode operating medium into the cathode chambers of the fuel cell and a cathode waste gas path for a discharge of a cathode waste gas from the cathode chambers.

Figure 2:
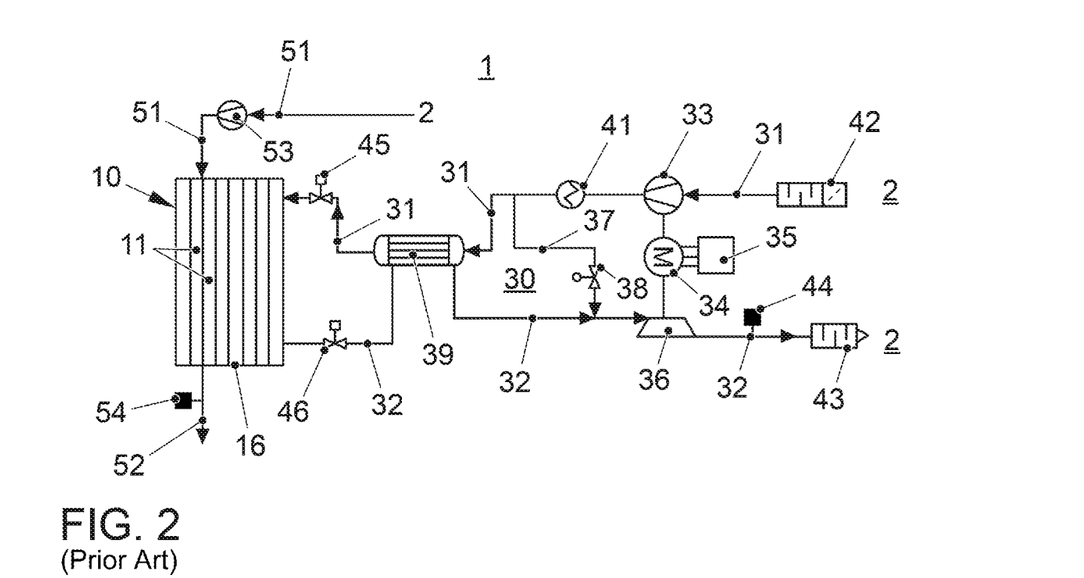
FIG. 2 a block diagram of a cathode supply and of a housing ventilation route for a fuel cell, according to the prior art.
Figure 3:
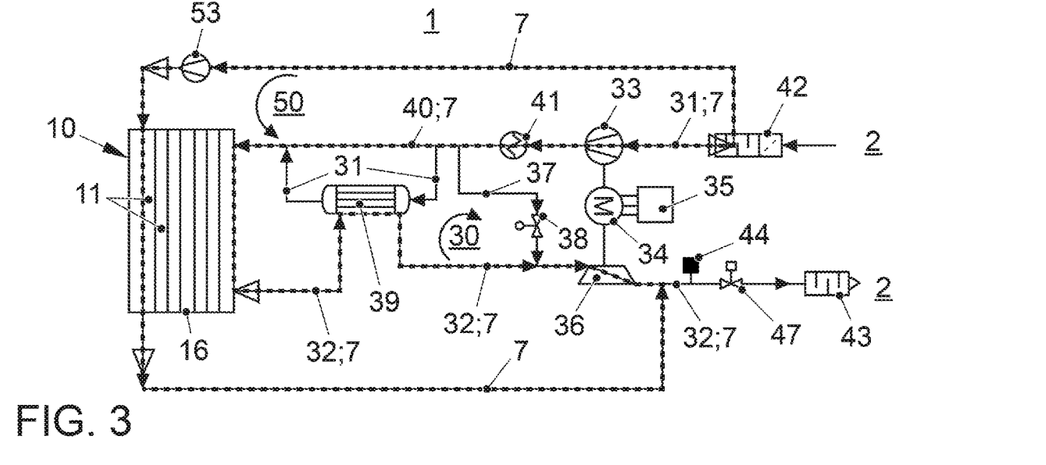
FIG. 3 a block diagram of a first embodiment of a cathode supply and of a flushing loop for a fuel cell according to the invention, with a housing ventilator as a recirculation fluid pressure generator.

An avoidance of situations which damage the fuel cell 10 itself has a significant influence on the lifespan of a fuel cell system 1; see also the prior art in FIG. 2. Such a damage, in particular a degradation, occurs when—among other things—oxygen is present at both the anode side and the cathode side of the membranes of the individual cells 11 at a start-up of the fuel cell 10 (problem of an air-air start). For this reason, it should be ensured on the part of the fuel cell system 1 and of an operating strategy that such situations occur only seldom. Among other things, how the fuel cell system 1 is shut down is of decisive importance for this. Upon shutting down the fuel cell system 1, oxygen must hereby be evacuated from the cathode supply 30 as far as is possible. This most often takes place via a cathode recirculation for a reaction of the remaining present oxygen, such that essentially only nitrogen is still found in a cathode fluid in the cathode supply 30, at least at the fuel cell 10.

In the course of a development of a fuel cell 10, efforts are made in addition to significantly reduce a platinum content of the electrodes in order to save costs. As a result, it is more important to avoid harmful operating states in order to achieve a desired service life of the fuel cell 10. Furthermore it is not possible to prevent hydrogen from diffusing from the fuel cell 10 into the environment. A stack housing 16 is additionally necessary to protect the fuel cell 10, whereby hydrogen may possibly accumulate within the stack housing 16. To avoid a flammable mixture within the stack housing 16, a housing ventilation route 51 is provided through the stack housing 16. Moreover, hydrogen sensors 44, 54 are used to demonstrate compliance with legal emissions regulations at the fluid outputs of both the cathode waste gas path 32 and the stack housing 16, by means of which sensors hydrogen possibly escaping into the environment can be detected.

In the prior art, a protection of the fuel cell 10 is also effected by using comparatively fluid-tight stop valves 45, 46 in the cathode supply 30 comparatively near the cathode for closing the fuel cell 10 off from the environment 2. Moreover, a cathode recirculation is most often set up by means of a cathode condenser 33. Furthermore, an increased content of platinum in the electrodes may be used to compensate for the degradation. In the prior art, a parallel ventilation of the stack housing 16 for cathode recirculation takes place by means of a housing ventilator 53. Alternatively, the ventilation may be realized by means of a jet pump. All of this requires a comparably large installation space, additional modules, and high demands made of the stop valves 45, 46 with regard to impermeability, whereby a desirable complete impermeability cannot be achieved. In the event of frost, problems may also arise upon opening the stop valves 45, 46. In addition to an increased expense in the production, installation and servicing of the fuel cell system, increased costs result.

It is an object of the invention to counter a degradation of the fuel cell without thereby using an increased precious metal content in the electrodes to provide a compensation for the degradation, but rather being able to maintain or decrease the precious metal content in the electrodes. This means that, on the part of a fuel cell system and an operating strategy, it should be ensured according to the invention that air-air starts of the fuel cell at most occur rarely. This should be realizable and feasible with simple and cost-effective means.

The object of the invention is achieved by means of an arrangement for a cathode recirculation of a fuel cell of a fuel cell system; via a method for cathode recirculation of a fuel cell; via a method for stack-housing flushing of a fuel cell; by means of a fuel cell system and/or by means of a vehicle, in particular an electric vehicle, according to the independent claims. Advantageous developments, additional features and/or advantages of the invention result from the dependent patent claims and the following description.

The arrangement according to the invention for a cathode recirculation comprises a cathode supply for the fuel cell, with a cathode supply path and a cathode waste gas path, wherein a flushing loop of a stack housing of the fuel cell is mechanically connected in terms of fluid to the cathode supply, and a recirculation fluid can be circulated in the cathode supply and in the flushing loop by means of a recirculation fluid pressure generator in the cathode supply and/or in the flushing loop. The cathode chambers of the fuel cell may hereby form a section of the arrangement, wherein the cathode chambers are connected mechanically, in terms of fluid, between the cathode supply path and the cathode waste gas path.

According to the invention, a combination of a functionality of a conventional housing ventilation of the fuel cell with a functionality of a conventional recirculation at the cathode of the fuel cell system takes place. In the cathode recirculation according to the invention, the housing ventilation is effected via the flushing loop and the recirculation at the cathode through the cathode supply, jointly or simultaneously, by means of a remaining fluid in the cathode supply and in the flushing circuit (recirculation fluid). The recirculation fluid is thereby composed of a fluid in the cathode supply path, that is, in most cases air; a fluid in the cathode waste gas path, that is, a cathode waste gas; and a fluid in the flushing loop, most often likewise air.

Since a ventilation of the stack housing of the fuel cell is required anyway in the fuel cell system, no additional module is required according to the invention. This means that currently available and cost-effective components may be used. A fluid outlet of the housing ventilation route from the prior art merely needs to be mechanically connected in terms of fluid to the cathode waste gas path. This may make a hydrogen sensor unnecessary since the flushing loop and the cathode supply share the same fluid outlet in the cathode waste gas path, which has a hydrogen sensor for the purpose of demonstrating compliance with the legal emissions regulations.

In the exemplary embodiments, the flushing loop is mechanically coupled in terms of fluid with the cathode supply path on one side and with the cathode waste gas path on the other side. Here the flushing loop is preferably mechanically connected in terms of fluid to the cathode supply path upstream of a cathode condenser, in particular at an air filter. The flushing loop is also preferably mechanically connected in terms of fluid to the cathode waste gas path downstream of a cathode turbine, in particular upstream of the hydrogen sensor.

By means of a comparatively large volume of oxygen (cathode supply plus comparatively voluminous flushing loop) that can be evacuated a longer-duration protection results against a cathode-side entry of oxygen into the fuel cell, and from there across the membranes of the membrane electrode assemblies of the fuel cell to an anode side of the fuel cell. According to the invention, a stop valve may possibly be omitted should the air filter be able to take over this functionality.

In exemplary embodiments, the recirculation fluid pressure generator is designed as a cathode condenser in the cathode supply path, or as a housing ventilator in the flushing loop. Given use of the housing ventilator as a recirculation fluid pressure generator, according to the invention an energy reduction takes place since the housing ventilator has a comparably low power consumption in comparison to the cathode condenser. In exemplary embodiments, a regulating means, in particular a stop valve, is provided in the cathode waste gas path, downstream of a mechanical fluid connection of the flushing loop at the cathode waste gas path. The specification "downstream" here relates to a fluid flow direction of a cathode waste gas in a normal operating state of the fuel cell.

According to the invention, for the cathode recirculation the cathode supply path, the cathode waste gas path and the flushing loop are mechanically connected in series in terms of fluid. With the cathode condenser as a recirculation fluid pressure generator, starting from said cathode condenser recirculation fluid can flow through the cathode supply path, the cathode chambers of the fuel cell, the cathode waste gas path (that is, the cathode supply) and the flushing loop (including the stack housing of the fuel cell). With the housing ventilator as a recirculation fluid pressure generator, starting from the housing ventilator recirculation fluid can flow through a portion of the flushing loop (preferably including the stack housing of the fuel cell), the cathode waste gas path, the cathode chambers of the fuel cell, the cathode supply path (that is, the cathode supply), and again a portion of the flushing loop (possibly including the stack housing of the fuel cell).

According to the invention, a simple stack-housing flushing may also take place, wherein air suctioned from the environment can be transported or conveyed once by means of the housing ventilator through the housing ventilation circuit as a flushing route, and from there via a fluid-mechanical connection of the housing ventilation circle to the cathode waste gas path through the (in this regard) downstream cathode waste gas path and into the environment.

In the recirculation method according to the invention, a recirculation fluid is transported or conveyed through a cathode supply path, through the cathode chambers of the fuel cell, and through a cathode waste gas path, wherein the recirculation fluid is also transported or conveyed through a flushing loop for a stack housing of the fuel cell and through the stack housing. Aforementioned advantages hereby also result in turn in the exemplary embodiments cited below.

In the exemplary embodiments, by means of the recirculation fluid pressure generator the recirculation fluid circulates through the cathode supply path, the cathode chambers of the fuel cell, the cathode waste gas path and the flushing loop, including the stack housing, or in reverse, until essentially an entirety of the oxygen in the recirculation fluid has reacted until gone. The recirculation fluid may also be transported or conveyed by means of a recirculation fluid pressure generator, wherein the recirculation fluid pressure generator is preferably designed as a cathode condenser in the cathode supply path and/or preferably as a housing ventilator in the flushing loop.

In exemplary embodiments, the housing ventilator will be deactivated or the housing ventilator will have been deactivated for the situation in which the recirculation fluid is transported or conveyed by means of the cathode condenser as a recirculation fluid pressure generator. Furthermore, the cathode condenser may be deactivated or the cathode condenser will be deactivated in the event that the recirculation fluid is transported or conveyed by means of the housing ventilator as a recirculation fluid pressure generator.

Given the stack-housing flushing method according to the invention, a flushing fluid is flushed by means of a housing ventilator through a flushing route and a stack housing of a fuel cell, wherein the flushing fluid is also flushed through a downstream section of a cathode waste gas path and from there is discharged into the environment. This means that an actual flushing route comprises the flushing route through the stack housing, a fluid-mechanical connection of the flushing route to the cathode waste gas path upstream of the hydrogen sensor, and a cathode waste gas path downstream of this and into the environment. Here the flushing fluid, most often air, is preferably drawn directly from the environment at an air filter or an air filter box.

The fuel cell system according to the invention for a vehicle, in particular an electric vehicle, or the vehicle according to the invention, in particular the electric vehicle, may have an arrangement according to the invention for a cathode recirculation. A method according to the invention for cathode recirculation (recirculation method) and/or a method according to the invention for stack-housing flushing (stack-housing flushing method) can also be performed via the fuel cell system according to the invention or the vehicle according to the invention.

The invention is explained in detail below using exemplary embodiments with reference to the attached schematic drawings. Elements, modules or components which possess an identical, one-to-one or analogous design and/or function are provided with the same reference characters in the figure description, the reference list and the patent claims, and/or are indicated by the same reference characters in figures of the drawings. Possible alternatives, static and/or kinematic reversals, combinations and so on with regard to the explained exemplary embodiments of the invention, or individual assemblies, parts or sections thereof, that are not explained in the description, not shown in the drawing and/or are non-exclusive, may be learned from the reference list.

All explained features, and also those on the reference list, are applicable not only in the specified combination indicated or the combinations indicated but also in a different combination or combinations, or alone. In particular, using the reference characters and the features associated with these in the description of the invention, the figure description and/or the reference list, it is possible to replace a feature or a plurality of features in the description of the invention and/or the figure description. A feature or a plurality of features may also be explained, specified in detail and/or substituted in the patent claims. Shown in the figures of the drawings are:

The invention is explained in detail using two embodiments of an arrangement for a cathode recirculation for a fuel cell 10 of a fuel cell system 1 for a vehicle, as well as a method for cathode recirculation and a method for stack-housing flushing of a fuel cell 10 of a fuel cell system 1 of a vehicle. However, the invention is not limited to such embodiments and/or the exemplary embodiments explained in the following, but rather is of a more basic nature, such that it may be applied to all arrangements for a cathode recirculation and methods for cathode recirculation and/or for stack-housing flushing, for example for stationary fuel cell systems. Although the invention has been described and illustrated in detail via preferred exemplary embodiments, the invention is not limited by the disclosed exemplary embodiments. Other variations may be derived from these without leaving the protective scope of the invention.

Figure 1:
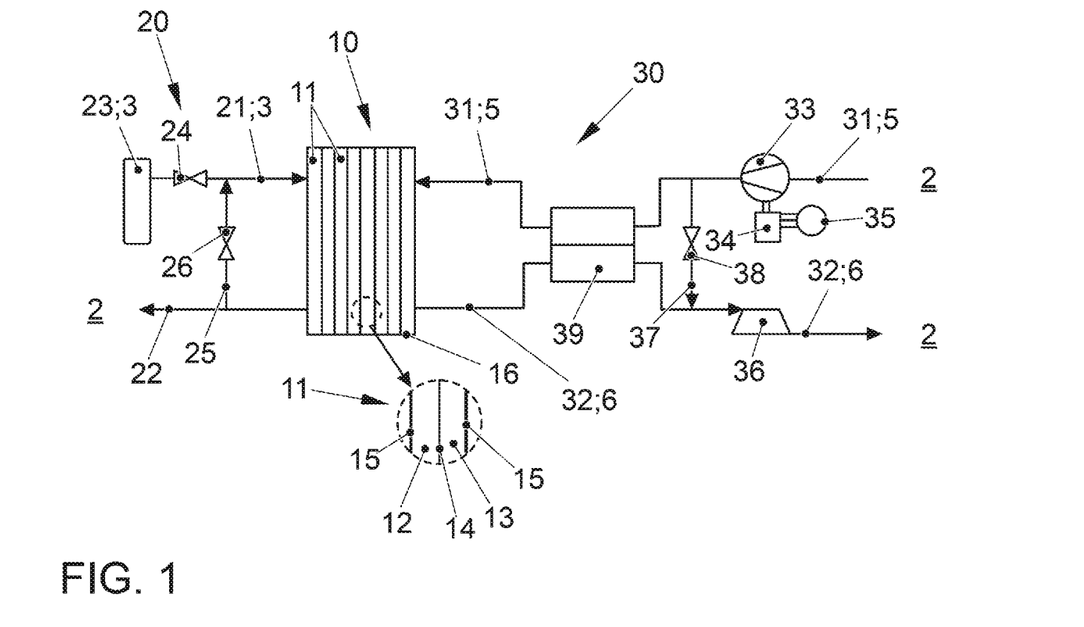
FIG. 1 a simplified block diagram of a preferred embodiment of a fuel cell system according to the invention.

FIG. 1 shows a fuel cell system 1 according to a first embodiment of the invention. The fuel cell system 1 is preferably part of a vehicle (not shown further), in particular a motor vehicle or an electric vehicle, which preferably has an electric traction motor that or which can be supplied with electrical energy by the fuel cell system 1.

The fuel cell system 1 comprises as a core component a fuel cell 10 or a fuel cell stack 10, which preferably has a plurality of fuel cells—referred to in the following as individual cells 11—arranged in the form of a stack, and is accommodated in a fluid-tight stack housing 16. Each individual cell 11 comprises an anode chamber 12 and a cathode chamber 13, wherein the anode chamber 12 and the cathode chamber 13 are separated from one another spatially and electrically by a membrane (part of a membrane electrode assembly 14, see below), preferably an ion-conductive polymer electrolyte membrane (see detail section). The fuel cell stack 10 is also simply referred to as a fuel cell 10.

The anode chambers 12 and the cathode chambers 13 of the fuel cell 10 are in each case bounded by a catalytic electrode (part of the membrane electrode assembly 14, see below), meaning an anode electrode and a cathode electrode, which in each case catalyze a partial reaction of a fuel cell conversion. The anode electrode and cathode electrode in each case have a catalytic material, for example platinum, which is present carried on an electrically conductive carrier material with a large specific surface area, for example a carbon-based material.

A structure made up of a membrane and electrodes associated therewith is also designated as a membrane electrode assembly 14. An indicated bipolar plate 15 is also arranged between two such membrane electrode assemblies 14 (only a single membrane electrode assembly 14 is shown in FIG. 1), which bipolar plate 15 serves to supply operating media 3, 5 into an appertaining anode chamber 12 of a first individual cell 11 and into an appertaining cathode chamber 13 of a second individual cell 11 adjacent thereto, and moreover realizes an electrical connection between the two individual cells 11 directly adjacent thereto.

An anode chamber 12 is formed between a bipolar plate 15 and an anode electrode of a membrane electrode assembly 14 that is directly adjacent to said bipolar plate 15, and a cathode chamber 13 is formed between a cathode electrode of the same membrane electrode assembly 14 and a second bipolar plate 15 directly adjacent to said cathode electrode. Optionally, gas diffusion layers can be arranged between the membrane electrode assemblies 14 and the bipolar plates 15.

In the fuel cell stack 10, or in the fuel cell 10, membrane electrode assemblies 14 and bipolar plates 15 are thus arranged or stacked in alternation.

To supply the fuel cell stack 10 or the fuel cell 10 with the operating media 3, 5, the fuel cell system 1 comprises on the one hand an anode supply 20 and on the other hand a cathode supply 30.

The anode supply 20 comprises an anode supply path 21, which serves to supply an anode operating medium 3, a fuel 3—for example hydrogen 3 or a hydrogenous gas mixture 3—into the anode chambers 12 of the fuel cell 10. For this purpose, the anode supply path 21 connects a fuel storage 23 or fuel tank 23 to an anode inlet of the fuel cell 10. The anode supply 20 also comprises an anode waste gas path 22 which discharges an anode waste gas 4 from the anode chambers 12 through an anode outlet of the fuel cell 10. A built-up anode operating pressure at an anode side of the fuel cell 10 can preferably be adjusted by means of a regulating means 24 in the anode supply path 21.

Moreover, the anode supply 20 preferably has a fuel recirculation line 25 which mechanically connects the anode waste gas line 22 in terms of fluid to the anode supply path 21. A recirculation of the anode operating medium 3, in other words the actual fuel 3 that is preferably to be put in, is often set up in order to return the anode operating medium 3 that is used most often leaner than stoichiometrically, to the fuel cell 10 and to use it. An additional regulating means 26 by means of which a recirculation rate can be adjusted is preferably arranged in the fuel recirculation line 25. A condenser (not shown) may also be provided in the fuel recirculation line 25.

The cathode supply 30 comprises a cathode supply path 31 which supplies an oxygen-containing cathode operating medium 5 to the cathode chambers 13 of the fuel cell stack 10, preferably air 5 which is in particular drawn in from the environment 2. The cathode supply 30 also comprises a cathode waste gas path 32 which discharges a cathode waste gas 6, in particular an exhaust air 6, from the cathode chambers 13 of the fuel cell 10 and conducts this to a waste gas device 43 (not shown in FIG. 1; see FIGS. 2 through 5) that is possibly provided.

A cathode condenser 33 is preferably arranged in the cathode supply path 31 for a conveyance and condensation of the cathode operating medium 5. In the presented embodiment, the cathode condenser 33 is designed as an exclusively or also electromotively driven cathode condenser 33 whose drive is provided by means of an electric motor 34 or a drive 34 which is preferably equipped with corresponding power electronics 35. The cathode condenser 33 is preferably designed as an electric turbocharger (ETC). The cathode condenser 33 may also be drivable by a cathode turbine 36 arranged in the cathode waste gas path 32, possibly with variable turbine geometry, supported by means of a common shaft (not shown in FIG. 1; see FIGS. 2 through 5). The cathode turbine 36 represents an expander which effects an expansion of the cathode waste gas 6, and thus a decrease in its fluid pressure (increase in an efficiency of the fuel cell system 1).

According to the presented embodiment, the cathode supply 30 may also have a wastegate 37 or a wastegate line 37 which connects the cathode supply path 31 or a cathode supply line with the cathode waste gas path 32 or a cathode waste gas line, in other words represents a bypass for the fuel cell 10. The wastegate 37 allows a mass flow of the cathode operating medium 5 to be temporarily reduced in the fuel cell 10 without shutting down the cathode condenser 33 or supplying the fuel cell 10 with a corresponding mass flow of the cathode operating medium 5 which is outside of the operating range of the cathode condenser 33. A regulating means 38 that is arranged in the wastegate 37 allows an adjustment of a volume flow of the cathode operating medium 5 that, if applicable, bypasses the fuel cell 10.

All regulating means 24, 26, 38, 47, 48 (see also below) of the fuel cell system 1 may be designed as adjustable, controllable or non-adjustable valves, butterfly valves, throttle valves and so on. For further isolation (see FIG. 2) of the fuel cell 10 from the environment 2, at least one additional corresponding regulating means 45, 46 may be arranged in an anode path 21, 22 and/or in a cathode path 31, 32, or in a line of the anode path 21, 22 and/or a line of the cathode path 31, 32.

The preferred fuel cell system 1 also has a moisture exchanger 39. The moisture exchanger 39 is on the one hand arranged in the cathode supply path 31 such that cathode operating medium 5 can flow through it. On the other hand, the moisture exchanger is arranged in the cathode waste gas path 32 such that cathode waste gas 6 can flow through it. The moisture exchanger 39 is on the one hand arranged in the cathode supply path 31, preferably between the cathode condenser 33 and a cathode intake of the fuel cell 10, and on the other hand in the cathode waste gas path 32, between a cathode outlet of the fuel cell 10 and the cathode turbine 36 if present. A moisture exchanger of the moisture exchanger 39 preferably has a plurality of membranes that are often either of planar design (see FIG. 3) or designed in the form of hollow fibers (not shown).

Various additional details of the fuel cell system 1, or of the fuel cell 10 of the fuel cell stack 10, of the anode supply 20, and of the cathode supply 30, are not depicted in the simplified FIG. 1 for reasons of clarity. The moisture exchanger 39 may thus be circumvented by means of a bypass line on the side of the cathode supply path 31 (see a moisture exchanger bypass 40 in FIGS. 3 through 5) and/or by means of a bypass line on the side of the cathode waste gas path 32. A turbine bypass line may also be provided by the cathode exhaust path 32, which bypass line bypasses the cathode turbine 36.

Furthermore, a water separator may be installed in the anode waste gas path 22 and/or in the cathode waste gas path 32, by means of which water separator a product water created from the appertaining partial reaction of the fuel cell 10 can be condensed and/or separated, and if applicable may be discharged into a water collector. Furthermore, the anode supply 20 may alternatively or additionally have a moisture exchanger 39 analogous to the cathode supply 30. The anode waste gas path 22 may also open into the cathode waste gas path 32, or vice versa, wherein the anode waste gas 4 and the cathode waste gas 6 may possibly be discharged via the common waste gas device 43 (FIGS. 2 through 5).

A cathode (re)circulation (see also the curved arrows 30 in FIGS. 3 and 5) is an effective measure for preventing a comparably long duration that, in a switched-off state of the fuel cell 10, leads to an oxygen entry into the cathode chambers 13 of the fuel cell 10, and thus not to an air-air start in the event of a re-start of the fuel cell 10. Here a recirculation fluid 7 remaining in the cathode supply 30, most often an air/waste gas mixture, is conveyed in a loop in the cathode supply 30 until it is monitored that essentially all oxygen in the recirculation fluid 7 has reacted until gone, and only residual components of the recirculation fluid 7 remain, in other words mainly nitrogen.

The invention consists of a housing ventilation route 51 known from the prior art, said housing ventilation route 51 having a fluid outlet 52, being incorporated into the cathode recirculation downstream of the stack housing 16 of the fuel cell 10 (see FIG. 2 and the aforementioned prior art), wherein the housing ventilation route 51 becomes a possibly temporary flushing loop 50 (see curved arrows 50 in FIGS. 3 and 5) of the fuel cell 10. Here a hydrogen sensor 54 at/in the fluid outlet 52 and also the fluid outlet 52 may be omitted (see FIG. 2). According to the invention, the flushing loop 50 thereby on one side opens into the cathode supply path 31, and on the other side into the cathode waste gas path 32, or is mechanically connected in terms of fluids to the cathode supply path 31 and to the cathode waste gas path 32.

The invention also consists of a ventilator 53 which is also used for a ventilation of the stack housing 16 capable of being used as a recirculation fluid pressure generator 53 for the recirculation at the cathode and also for a simultaneous flushing of the flushing loop 50; here, the two together are referred to as a cathode recirculation. According to the invention, such a housing ventilator 53 may draw the recirculation fluid 7 out of the cathode supply path 31, directly to an air filter 42 or an air filter box 42 (see FIG. 3); convey the recirculation fluid 7 through the stack housing 16; conduct it into the cathode waste gas path 32, from where the recirculation fluid 7 passes through the cathode chambers 13 of the fuel cell 10 and the cathode supply path 31, up to the air filter 42, from where the recirculation fluid 7 again enters the flushing loop 50 (dashed arrows in FIG. 3).

So that the recirculation fluid 7 can flow through the cathode supply 30 in a deactivated state of the fuel cell 10, an additional regulating means 47, 48 (regulating means 48 is only intimated in FIG. 4) is necessary, in particular a stop valve 47, 48, at/in at least one of the two openings of the cathode supply 30. Since a regulating means 47, for example a butterfly valve 47 or the stop valve 47, is possibly required anyway for open- or closed-loop control of a mass flow or of a fluid pressure in the cathode waste gas path 32, this may be used for this purpose. If, in the deactivated state of the fuel cell 10, the cathode condenser 33 is switched off and the regulating means 47 is closed, flow will pass through the cathode supply 30 between a fluid-mechanical connection of the flushing loop 50 at the cathode waste gas path 32 and a suction of the flushing loop 50 at the cathode supply path 3, in an order that is reversed in comparison to a normal operation of the fuel cell 10.

Because oxygen is no longer present in the cathode supply 30 and in the flushing loop 50, which is apparent from an electrical voltage supplied from the fuel cell 10, the fuel cell system 10 may be completely deactivated. Optionally, the cathode of the fuel cell 10 may additionally be sealed by possible additional valves 47, 48 (see also FIG. 4) in order to reduce an oxygen diffusion, which valves 47, 48 do not however necessarily have high requirements for imperme- ability. Standard butterfly valves 47, 48 may be used here.

Figure 4:
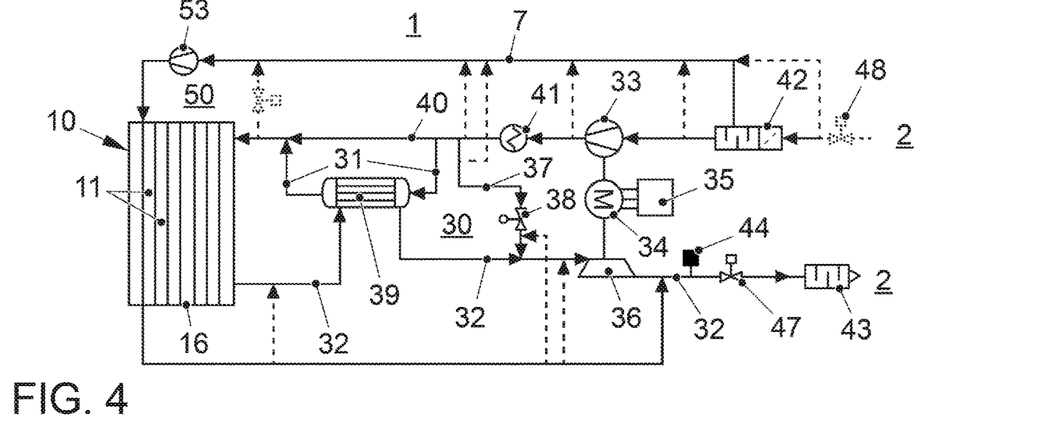
FIG. 4 a block diagram which illustrates where the flushing loop can be mechanically coupled in terms of fluid to the cathode supply as an arrangement for cathode recirculation of the fuel cell.

FIG. 4 shows alternative ways (dashed lines) of connect- ing the flushing loop 50 to the cathode supply 30. In principle, a first fluid connection of the flushing loop 50 to the entire route of the cathode supply path 31 may be implemented. In relation to a conventional flow direction in the cathode supply path 31 during normal operation of the fuel cell 10, for example, the first fluid connection may thus be made upstream of the air filter 42; upstream of the cathode condenser 33; upstream or downstream of a charge air cooler 41; at/in the wastegate 37 (on the side of the supply path, before the regulating means 38); or downstream of the moisture exchanger 39 or of the moisture exchanger bypass 40 on the supply path side.

In principle, a second fluid connection of the flushing loop 50 to the entire route of the cathode supply path 32 may be implemented. In relation to a conventional flow direction in the cathode waste gas path 32 during normal operation of the fuel cell 10, the second fluid connection may thus be made upstream or downstream of the moisture exchanger 39 or of a moisture exchanger bypass on the side of the waste-gas path (not shown); at/in the wastegate 37 (on the side of the waste-gas path before the regulating means 38); or upstream or downstream of the cathode turbine 36. A regulating means (see FIG. 4) may also be provided in the flushing loop 50.

Figure 5:
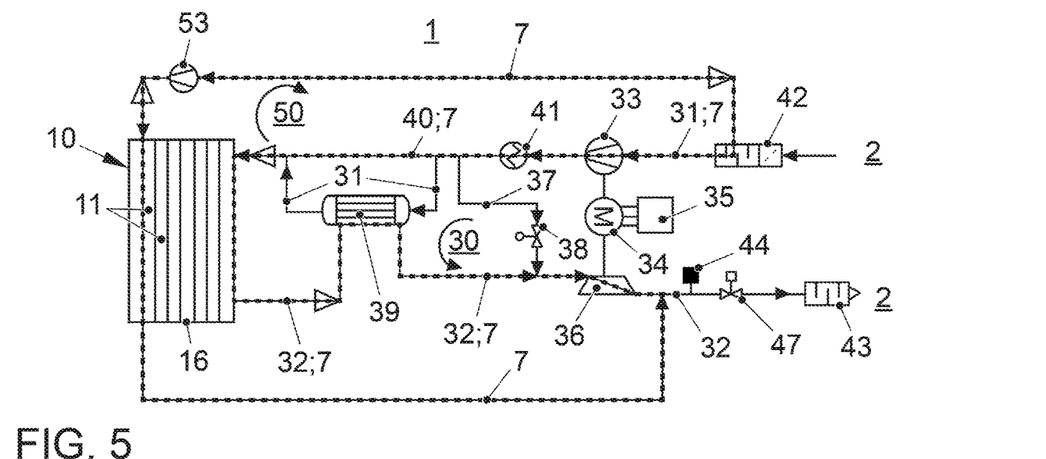
FIG. 5 a block diagram of a second embodiment of a cathode supply and of a flushing loop for a fuel cell according to the invention, with a cathode condenser as a recirculation fluid pressure generator.

According to the invention, both the housing ventilator 53 and the cathode condenser 33 may be used as a recirculation fluid pressure generator 53, 33 for the cathode recirculation. Preferably the housing ventilator 53 is used since this is operated in a more energy-favorable manner (see above). FIG. 5 shows a cathode recirculation by means of the cathode condenser 33 as a recirculation fluid pressure gen- erator 33, wherein here the cathode recirculation takes place in an order that is reversed relative to the cathode recircu- lation by means of the housing ventilator 53. This means that, starting from the cathode condenser 33, recirculation fluid 7 flows first through the cathode supply path 31 (in segments), the cathode chambers 13 of the fuel cell 10, the cathode waste gas path 32, a first segment of the flushing loop 50, the stack housing 16, a second segment of the flushing loop 50, and again the cathode supply path 31 (in segments), up to the cathode condenser 33 (dashed arrows in FIG. 5).

A flushing of the stack housing 16 alone is even possible (stack-housing flushing functionality), wherein the regulat- ing means 47 is opened for this. If applicable, the regulating means 48 is closed (not the exemplary embodiment accord- ing to FIG. 4). Here the housing ventilator 53 draws in flushing air, for example at the air filter 42 or air filter box 42; transports this through the flushing loop 50, including the stack housing 16, into the cathode waste gas path 32 upstream of the hydrogen sensor 44, from where the flushing air passes through the open regulating means 47 and possi- bly a waste gas device 43 or a sound damper 43, and exits into the environment 2.

LIST OF REFERENCE SYMBOLS 1 fuel cell system, fuel cell assembly, preferably for a vehicle with an electric motor, in particular an electric traction motor
2 environment
3 operating medium, reactant, in particular anode operating medium, the actual fuel, preferably water or aqueous gas mixture
4 waste gas including liquid water, in particular anode waste gas
5 operating medium, reactant, in particular cathode operat- ing medium, preferably air
6 waste gas including liquid water, in particular cathode waste gas, preferably exhaust air
7 recirculation fluid; fluid remaining in the cathode supply 30 (including the cathode chambers 13) as well as of the flushing loop 50 (including the stack housing 16), air- waste gas mixture
10 fuel cell, fuel cell stack
11 individual cell with anode electrode of the anode of the fuel cell 10, and cathode electrode of the cathode of the fuel cell 10; individual fuel cell
12 anode chamber of an individual cell 11
13 cathode chamber of an individual cell 11

14 membrane electrode assembly, preferably with polymer electrolyte membrane as well as an anode electrode and a cathode electrode
15 bipolar plate, flow field plate, separator plate
16 stack housing of the fuel cell 10
20 fuel cell supply, anode supply, anode loop of the fuel cell 10 or of the fuel cell stack 10
21 path, supply path, flow path, anode supply path
22 path, waste gas path, flow path, anode waste gas path
23 fuel storage, fuel tank with anode operating medium 3
24 regulating means, adjustable, activatable/controllable, non-adjustable, in particular valve, butterfly valve, throttle valve and so on
25 fuel recirculation line
26 regulating means, adjustable, activatable/controllable, non-adjustable, in particular valve, butterfly valve, throttle valve and so on
30 fuel cell supply, cathode supply, cathode loop of the fuel cell 10 or of the fuel cell stack 10
31 path, supply path, flow path, cathode supply path
32 path, waste gas path, flow path, cathode waste gas path
33 condenser, cathode condenser, compressor, turbocharger
34 motor, in particular electric motor or drive (possibly including gearing)
35 electronics, in particular power electronics for the motor 34
36 turbine with possibly variable turbine geometry, cathode turbine, recirculation fluid pressure generator, expander
37 wastegate, wastegate line
38 regulating means, adjustable, activatable/controllable, non-adjustable, in particular valve, butterfly valve, throttle valve and so on
39 moisture exchanger, humidifier
40 moisture exchanger bypass
41 charge air cooler
42 air filter, air filter box
43 waste gas device, sound damper
44 hydrogen sensor
45 stop valve for cathode supply path 31 (prior art)
46 stop valve for cathode waste gas path 32 (prior art)
47 regulating means, adjustable, activatable/controllable, non-adjustable, in particular stop valve for cathode waste gas path 32
48 regulating means, adjustable, activatable/controllable, non-adjustable, in particular stop valve for cathode supply path 31
50 flushing/housing ventilation loop of the fuel cell 10, flushing route for stack-housing flushing functionality
51 housing ventilation route (prior art)
52 fluid outlet of the housing ventilation route (prior art)
53 housing ventilator, recirculation fluid pressure generator
54 hydrogen sensor (prior art)

The invention claimed is:

1. A system, comprising:
a fuel cell stack including a fuel cell having an anode and a cathode;
a cathode supply having a cathode supply path configured to deliver a cathode operating medium to the cathode of the fuel cell, and a cathode waste gas path configured to discharge a cathode waste gas from the cathode of the fuel cell;
a stack housing that houses the fuel cell stack and includes a flushing loop that is distinct from the cathode supply and that is fluidically connected to the cathode supply path and to the cathode waste gas path; and
a recirculation fluid pressure generator located in the cathode supply or in the flushing loop;
wherein a recirculation fluid can be circulated along a flow path that extends from the cathode supply path to the flushing loop, through the flushing loop and the stack housing, from the flushing loop to the cathode waste gas path, from the cathode waste gas path to the cathode of the fuel cell, and from the cathode of the fuel cell to the cathode supply path, by the recirculation fluid pressure generator.

2. The fuel cell system according to claim 1, wherein the recirculation fluid pressure generator is a cathode condenser located in the cathode supply path or a housing ventilator located in the flushing loop.

3. The fuel cell system according to claim 1, wherein the cathode waste gas path includes a regulator downstream of a fluid-mechanical connection of the flushing loop to the cathode waste gas path.

4. A method, comprising:
conveying a recirculation fluid along a flow path that extends through a cathode supply path, then from the cathode supply path to cathode chambers of a fuel cell, then through the cathode chambers of the fuel cell, then from the cathode chambers of the fuel cell to a cathode waste gas path, then through the cathode waste gas path, then from the cathode waste gas path to a flushing loop that extends through a stack housing that houses a fuel cell stack that includes the fuel cell, then through the flushing loop and the stack housing, and then from the flushing loop back to the cathode supply path.

5. The method according to claim 4, wherein the recirculation fluid is conveyed by a recirculation fluid pressure generator.

6. The method according to claim 5, further comprising:
using the recirculation fluid pressure generator to circulate the recirculation fluid through the cathode supply path, the cathode chambers, the cathode waste gas path, the flushing loop, and the stack housing until essentially no oxygen remains in the recirculation fluid.

7. The fuel cell system according to claim 1 wherein the flushing loop is fluidically connected to the cathode supply path upstream of a cathode condenser.

8. The fuel cell system according to claim 1 wherein the flushing loop is fluidically connected to an air filter.

9. The fuel cell system according to claim 1 wherein the flushing loop is fluidically connected to the cathode waste gas path downstream of a cathode turbine.

10. The fuel cell system according to claim 1 wherein the flushing loop is fluidically connected to the cathode waste gas path upstream of a hydrogen sensor.

11. The fuel cell system according to claim 3 wherein the regulator is a stop valve.

12. The method according to claim 5 wherein the recirculation fluid pressure generator is a cathode condenser located in the cathode supply path.

13. The method according to claim 12 wherein the recirculation fluid pressure generator includes a housing ventilator in an inactive state.

14. The method according to claim 5 wherein the recirculation fluid pressure generator is a housing ventilator in the flushing loop.

15. The method according to claim 14 wherein the recirculation fluid pressure generator includes a cathode condenser in an inactive state.

16. A method, comprising:
conveying a recirculation fluid along a flow path that extends through a cathode supply path, then from the cathode supply path to a flushing loop that extends through a stack housing that houses a fuel cell stack that includes a fuel cell, then through the flushing loop and the stack housing, then from the flushing loop to a cathode waste gas path, then through the cathode waste gas path, then from the cathode waste gas path to cathode chambers of the fuel cell, then through the cathode chambers of the fuel cell, and then from the cathode chambers of the fuel cell back to the cathode supply path.

17. The method according to claim 16, wherein the recirculation fluid is conveyed by a recirculation fluid pressure generator.

18. The method according to claim 17, further comprising:
   using the recirculation fluid pressure generator to circulate the recirculation fluid through the cathode supply path, the cathode chambers, the cathode waste gas path, the flushing loop, and the stack housing until essentially no oxygen remains in the recirculation fluid.

19. The method according to claim 17 wherein the recirculation fluid pressure generator is a cathode condenser located in the cathode supply path.

20. The method according to claim 17 wherein the recirculation fluid pressure generator is a housing ventilator in the flushing loop.

* * * * *